April 13, 1937.  R. B. HEARN  2,077,172

TELEGRAPH SIGNAL DISTORTION MEASURING DEVICE

Filed Dec. 19, 1934

INVENTOR
R. B. HEARN
BY
J. W. Schmied
ATTORNEY

Patented Apr. 13, 1937

2,077,172

UNITED STATES PATENT OFFICE 2,077,172

TELEGRAPH SIGNAL DISTORTION MEASURING DEVICE

Richard B. Hearn, Hollis, N. Y., assignor to Bell Telephone Laboratories, Incorporated, New York, N. Y., a corporation of New York Application December 19, 1934, Serial No. 758,158

7 Claims. (Cl. 178—69)

This invention relates to telegraph apparatus and more particularly to apparatus for measuring signal distortion in a start-stop telegraph system.

One of its objects is to give a visible indication of the extent of the distortion at either end of each signal impulse.

More specifically stated, this object is to obtain an indication of the maximum displacement of either end of each signal impulse transmitted over a circuit or by a device under test and thereby determine the quality of telegraph transmission.

An important feature of the present invention is that it permits observation of signal distortion to be made with accuracy and ease on start-stop printing telegraph circuits while they are in service and without disturbing the transmission of signals over the circuits.

In an embodiment of the present invention the device for indicating and measuring the distortion of start-stop telegraph signals comprises a cathode ray tube arranged to be operated by an oscillator circuit which operates at the frequency of the incoming telegraph signal impulses and a timing circuit controlled by the incoming telegraph impulses and arranged to cooperate with both the cathode ray tube and the oscillator circuit for causing the cathode ray beam to be impinged, at each reversal in signal current, on a graduated scale of the tube whereby the quality of the signal is indicated. Normally, that is, when no signal impulses are being received, the cathode ray beam is impinged at the zero point on the graduated scale which is arranged horizontally across the end of the tube. During the time that the signal impulses are being received, the cathode ray beam is caused to be impinged at each reversal of signal current, either above or below the horizontal line of the graduated scale. However, should distortion be present in the incoming signal impulses the cathode ray beam will appear not only above or below the scale, but also a distance from either side of the zero point proportionate to the distortion of the signal impulse.

Figure 1:
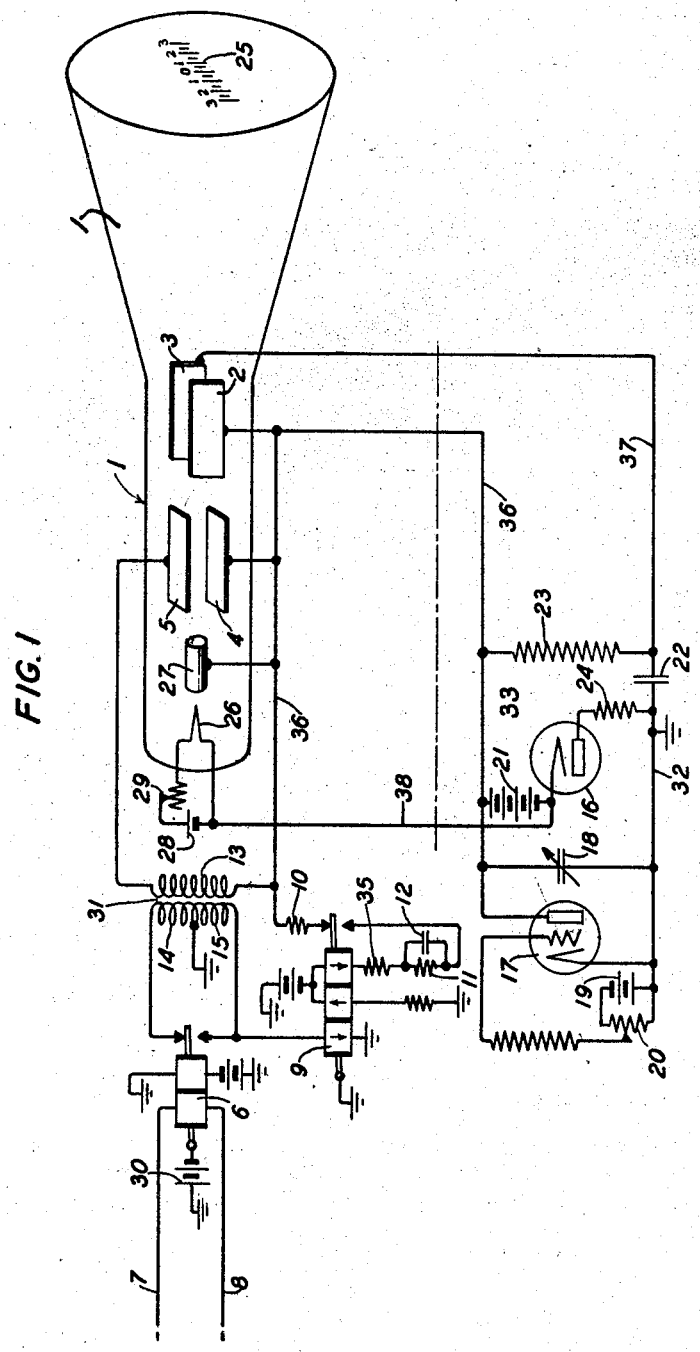
Figure 2:
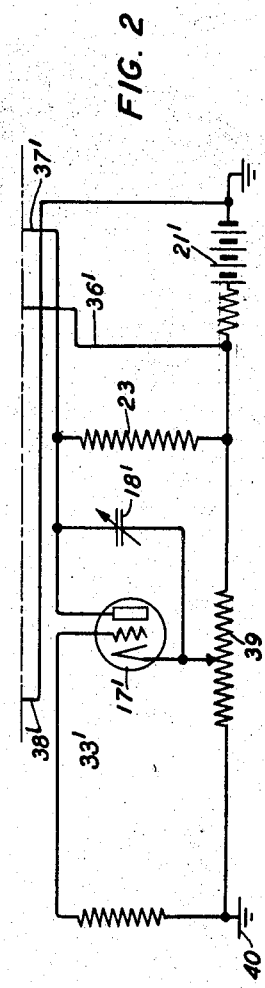

Illustrations of the invention are shown in the following drawing:

Fig. 1 shows in schematic form the complete arrangement for indicating and measuring signal distortion in accordance with the present invention; and Fig. 2 shows another type of oscillator circuit adapted for use in the arrangement shown in Fig. 1.

The invention will be more readily understood by reference to Fig. 1 which shows a cathode ray oscillograph arranged to show the deviation of incoming telegraph signal impulses from a desired standard. In this embodiment of the invention, the cathode ray is caused to move across the scale in accordance with pulses of current generated by an oscillator, whose frequency is that of correctly timed telegraph pulses while the beginning and ending of each telegraph pulse causes the ray to be deflected in a direction at right angles to the scale. The circuits are interconnected so that the oscillator is started by the first incoming telegraph pulse of a group, such as used in teletypewriter signaling, and if the telegraph pulses are correctly timed, they will occur at the point of zero voltage of the oscillator. Thus, a correctly timed set of telegraph pulses which show on the scale as aligned across the scale with impulses above and below the scale at the zero point, and if they are incorrectly timed the impulses will show at other points besides the zero point. The invention will now be described in detail in connection with Fig. 1 of the drawing.

Cathode ray oscillograph tube 1 is of the conventional type having two sets of deflecting plates 2—3 and 4—5 set at right angles to each other. A beam of electrons from filament 26, which is energized by battery 28 through variable resistance 29, traverses anode cylinder 27 and impinges upon the coated surface of the tube at the zero point of scale 25 causing a luminous spot at that point. The line circuit which is normally closed extends through the left-hand winding of line relay 6. Teletypewriter signals introduced in this circuit cause the current flowing in the left-hand winding to be interrupted for one or more intervals for each character. During these interruptions the current normally flowing through the right-hand winding of relay 6 causes the armature thereof which is normally held against its upper contact, to move from the upper to the lower contact. During periods when current flows in the left-hand winding of the relay, the armature thereof operates from the lower to the upper contact. The first pulse of a teletypewriter character, known as the start pulse, opens the line circuit, thus causing the armature of relay 6 to operate to its lower contact. The armature of relay 6 upon operating to its lower contact establishes a circuit through the left-hand winding of relay 9, causes the armature of relay 9 to operate to its lower contact. Also upon relay 6 operating to its lower position a circuit is closed through primary 15 of the transformer 31 to ground. The closing of the latter circuit causes a momentary kick to be induced in the secondary winding 13.

As soon as the armature of relay 9 is operated to its lower contact, current flows through the right-hand winding and commences to charge condenser 12. Resistance 11 which is connected in shunt across condenser 12 is of a high ohmic value and therefore condenser 12 can be charged to a high potential. The rate at which condenser 12 is charged is controlled by resistance 35. The current flowing through the right-hand winding of relay 9 is such in a direction as to hold the armature thereof on its lower contact. The current in charging condenser 12 decreases until it is less than the value of current through the middle winding of relay 9. If the armature of relay 6 is not on its lower contact at this time, the current flowing in the middle winding will operate the armature of relay 9 back to its upper contact.

When the armature of relay 9 leaves its upper contact, the circuit extending from ground on the armature of relay 9, the upper contact of relay 9, resistance 10, conductor 36, condenser 18 to ground, is opened whereby the condenser 18 is charged by battery 21 in a circuit including vacuum tube 16 and resistance 24. When the potential on condenser 18 reaches the value determined by the value of the potential applied to the grid circuit of tube 17, which is of the gas-filled, or trigger, type, a plate current will flow in tube 17. The resistance of the plate circuit of tube 17 becomes very low when plate current is flowing and therefore the discharge of condenser 18 is effected. When the potential on condenser 18 reaches a very low value, the plate current in tube 17 is interrupted and condenser 18 commences to charge again from battery 21 in series with vacuum tube 16 and resistance 24. The voltage on condenser 18, which voltage is of a pulsating character, is applied across the deflecting plates 2—3 of the cathode ray tube 1 in a circuit including condenser 22 and a shunt resistance 23. Condenser 18 together with its charging circuit and tube 17 constitute oscillator 33. Oscillator 33 is adjusted by means of variable condenser 18 and potentiometer 20 to have the period of oscillation of a correctly timed set of printer telegraph pulses and condenser 22 and resistance 23 are furnished merely to give stability to the oscillator.

The beam of electrons from filament 26 in the cathode ray tube which causes a luminous spot to be projected on the screen, or coated surface, of the cathode ray tube, is deflected by the pulsating voltage applied to the deflecting plates 2—3 by the recurring charges and discharges of condenser 18, so that the luminous spot on the screen may move horizontally back and forth across the screen. The pulsating voltage on condenser 18 rises and falls in synchronism with the elements of the typewriter signals incoming over line circuit 7—8. The momentary kicks induced in secondary winding 13 of transformer 31, which are caused by the operation of the armature of relay 6 in response to the teletypewriter signals incoming over the line circuit, impresses a pulsating voltage across the deflecting plates 4—5. The pulsating voltage on plates 4—5 causes the beam of electrons in the cathode ray tube to move vertically in an oscillating path so that the luminous spot on the screen of the cathode ray tube appears to move in both horizontal and vertical paths. Should the incoming signals be perfect and the oscillator circuit 33 comprising tube 17 and condenser 18 together with the charging circuit, be operating in synchronism with the incoming teletypewriter signals, the discharges of condenser 18 will occur at times when the luminous spot is at the zero point on the scale 25, so that the luminous spot will oscillate vertically at the zero point. However, should the pulses from oscillator 33 not coincide exactly in frequency and relation with the impulses of the incoming teletypewriter signals, the luminous spot will oscillate at various points on either side of the zero point, the distances from the zero point that the luminous spot appears, depending on the amount of distortion present in the impulses of the incoming teletypewriter signals. When signals are received the start impulse of each teletypewriter signal, or character, operates the armature of relay 9 to its lower contact thereby allowing oscillator 33 to start oscillating. Relay 9 allows the oscillator to continue oscillating for the duration of the other elements of the incoming signal, at the end of which time the relay armature returns to the upper contact to stop the oscillation and establish a reference voltage for starting the oscillator on the next incoming signal. The various elements in this circuit arrangement are so proportioned that the period of time that the armature of relay 9 is away from its upper contact is exactly equal to the standard interval covered by one train of printer pulses corresponding to a signal character.

In Fig. 2 is shown an oscillator 33' which may be used in place of the oscillator 33 shown in Fig. 1. A substitution may be effected by connecting conductors 36, 37 and 38 of Fig. 1 to conductors 36', 37' and 38', respectively, as shown. The oscillator 33' operates substantially the same as oscillator 33 of Fig. 1 except that the vacuum tube used in conjunction with the circuit for charging condenser 18 is omitted. In the arrangement shown in Fig. 2, the removal of ground from the armature of relay 9 when the armature moves over to its lower contact causes current to flow in the circuit including resistance 23', variable condenser 18', potentiometer 39 and ground connection 40 thereby charging condenser 18' to a value determined by the value of the potential applied to the grid circuit of tube 17'. When the voltage charge on condenser 18' rises to the desired value, plate current flows in tube 17' to effect the discharge of condenser 18'. Tube 17 is a gas-filled tube. The charge and discharge of condenser 18' impresses a voltage on plate 2—3 similar to that described above for Fig. 1.

What is claimed is:

1. Apparatus for indicating and measuring the distortion of telegraph signals, which comprises a source of incoming signals, parallel paths for receiving said signals, an electron discharge device responsive to the signals received over one of said paths, a timing device in the other of said paths, an oscillating device controlled by said timing device and arranged to impress voltages on said electron discharge device at regular intervals, and an indicating element in said electron discharge device for indicating any difference in duration between the intervals of signal impulses incoming from said source and the corresponding impulses produced by said oscillating device.

2. Apparatus for indicating and measuring the distortion of telegraph signals, which comprises a source of incoming start-stop signals, a relay responsive to the signals from said source, a cathode ray tube, a transformer responsive to the operation of said relay, an output circuit for said transformer for causing the ionic beam of said tube to oscillate in a definite path, a timing circuit comprising a second relay responsive to the signals repeated by the first-mentioned relay, an oscillator controlled by said second relay and arranged to operate at the frequency of the signals of said source, an element in said tube for causing, in response to the operation of said oscillator, the ionic beam of said tube to be deflected to either side of said definite path when distortion is present in the signals of said source.

3. Apparatus for indicating and measuring the distortion of telegraph signals, according to claim 2, wherein the oscillator circuit comprises gaseous electronic devices, output paths for said devices, the output paths of said devices being directly connected to said timing circuit and said cathode ray tube.

4. Apparatus for indicating and measuring the distortion of telegraph signals, according to claim 2, wherein the timing circuit comprises a normally biased relay of the polarized type connected directly to the oscillator circuit.

5. Apparatus for indicating and measuring the distortion of telegraph signals, according to claim 2, wherein the cathode ray tube comprises two pairs of deflecting plates to control the beam, the oscillator being arranged to control the beam through one set of plates and the first mentioned relay being arranged through said transformer to control the beam through the other set.

6. Apparatus for indicating and measuring the distortion of telegraph signals, according to claim 2, wherein the relay of said timing circuit is normally biased and comprises a circuit for holding said relay in its alternate position during the time that a start-stop group of signal impulses is being received from said source.

7. Apparatus for indicating and measuring the distortion of telegraph signals, according to claim 2, wherein said timing circuit and said oscillator have interconnecting them a normally closed circuit controlled by said timing circuit and controling the operation of said oscillator, said normally closed circuit being arranged to open in response to the first impulse of a start-stop group of signal impulses received from said source and to remain open only while said start-stop group is being received.

RICHARD B. HEARN.